(12) United States Patent
Kato et al.

(10) Patent No.: US 8,701,969 B2
(45) Date of Patent: Apr. 22, 2014

(54) DETERMINING FRICTION STIR WELDING DWELL TIME TO PRODUCE A JOINED MEMBER

(75) Inventors: Yoshinori Kato, Tokyo (JP); Kazushige Yamasu, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/386,959

(22) PCT Filed: Jan. 15, 2010

(86) PCT No.: PCT/JP2010/000204
§ 371 (c)(1),
(2), (4) Date: Jan. 25, 2012

(87) PCT Pub. No.: WO2011/086602
PCT Pub. Date: Jul. 21, 2011

(65) Prior Publication Data
US 2012/0125522 A1 May 24, 2012

(51) Int. Cl.
*B23K 20/12* (2006.01)

(52) U.S. Cl.
USPC .................................................. 228/112.1

(58) Field of Classification Search
None
See application file for complete search history.

(56) References Cited

U.S. PATENT DOCUMENTS

| | | | |
|---|---|---|---|
| 6,729,526 B2 | 5/2004 | Okamoto et al. | |
| 6,745,929 B1 * | 6/2004 | Ezumi et al. | 228/112.1 |
| 7,036,707 B2 * | 5/2006 | Aota et al. | 228/112.1 |
| 7,275,675 B1 * | 10/2007 | Carter et al. | 228/2.1 |
| 8,191,753 B2 * | 6/2012 | Fleming et al. | 228/2.1 |
| 2003/0047584 A1 | 3/2003 | Okamoto et al. | |
| 2003/0047590 A1 | 3/2003 | Okamoto et al. | |
| 2004/0173663 A1 | 9/2004 | Okamoto et al. | |
| 2005/0006438 A1 * | 1/2005 | Andersson et al. | 228/112.1 |
| 2010/0178526 A1 * | 7/2010 | Fujii et al. | 428/615 |

FOREIGN PATENT DOCUMENTS

| | | | |
|---|---|---|---|
| JP | 2002001551 A | 1/2002 | |
| JP | 2003080380 A | 3/2003 | |
| JP | 2005095951 A | 4/2005 | |
| JP | 2006007327 A | 1/2006 | |
| JP | 2006026701 A | 2/2006 | |
| JP | 2007289976 A | 11/2007 | |

OTHER PUBLICATIONS

Funderburk, "A look at HEAT Input", Welding Innovation vol. XVI, No. 1, 1999.*
International Search Report and Written opinion for PCT/JP2010//000204 dated Apr. 20, 2010.
Office Action dated Nov. 27, 2013, corresponds to Chinese patent application No. 201080031462.X.

* cited by examiner

*Primary Examiner* — Kiley Stoner
*Assistant Examiner* — Carlos Gamino
(74) *Attorney, Agent, or Firm* — Benjamin J. Hauptman; Manabu Kanesaka

(57) ABSTRACT

The present invention relates to a technique for producing a jointed member by subjecting two to-be-jointed members which are contacted each other to friction stir welding. The method for producing a jointed member executes a dwelling step in which a probe is rotated only for a predetermined period at at least one of a probe starting point position which is a position of the probe for forming a joint starting point in the to-be-jointed member and a probe end point position which is a position of the probe for forming a joint end point in the to-be-jointed member.

7 Claims, 6 Drawing Sheets

DETERMINING FRICTION STIR WELDING DWELL TIME TO PRODUCE A JOINED MEMBER

RELATED APPLICATIONS

The present application is a National Phase of International Application Number PCT/JP2010/000204, filed Jan. 15, 2010.

TECHNICAL FIELD

The disclosed embodiment(s) relates to a method for producing a joined member by subjecting two workpieces to friction stir welding through rotation of a probe and also relates to a friction stir welding apparatus.

BACKGROUND

A friction stir welding method is a technique in which, while a tool is rotated, a probe installed at the leading end of the tool is inserted into workpieces and, then plastic flow resulting from frictional heat occurring between the rotating tool and the workpieces due to movement of the rotating tool is used to weld the workpieces.

The friction stir welding method is advantageous in that a joint part is not melted by high heat during welding and, therefore, the workpieces are not distorted or deformed.

Techniques for enhancing the welding reliability of friction stir welding includes, for example, the techniques described in Patent Documents 1 and 2.

In friction stir welding, when a probe is withdrawn at a probe end point position where a joint end point in a joint part is formed, a probe withdrawing hole is left in the vicinity of the joint end point. Also, the welding reliability remains uncertain in the vicinity of the joint end point. Therefore, in the techniques disclosed in Patent Documents 1 and 2, after the probe has been moved to the probe end point position, the probe is not immediately withdrawn at this position but the probe is moved to a position away from the probe end point position and, then, the probe is withdrawn. In the above-described technique, the probe is withdrawn at a position away from the probe end point position, by which the probe withdrawing hole is placed away from the joint end point to improve the welding reliability in the vicinity of the joint end point.

PATENT DOCUMENTS

Patent Document 1: Japanese Published Unexamined Patent Application No. 2005-95951
Patent Document 2: Japanese Published Unexamined Patent Application No. 2007-289976

The technique disclosed in Patent Documents 1 and 2 is able to certainly improve welding reliability. However, there is a problem that, between a joint starting point in a joint part and a probe starting point position for forming the joint starting point or between a joint end point and a probe end point position, a large amount of an oxidized film on a boundary face between workpieces remains and the welding reliability remains uncertain.

In recognition of the above-described problem that the conventional technique has, an object of the disclosed embodiment(s) is to provide a method for producing a joined member capable of improving the welding reliability and also a friction stir welding apparatus.

SUMMARY

In order to solve the above-described problem, the disclosed method for producing a joined member is a method for producing a joined member in which a rotating probe is inserted into a portion to be joined in two workpieces which are contacting each other and a friction stir welding operation is continuously performed to the portion to be joined to produce a joined member. Also, the method includes a main joining step in which the probe is moved, while being rotated, from a probe starting point position which is a position of the probe for forming a joint starting point in one of the workpieces to a probe end point position which is a position of the probe for forming a joint end point in the workpiece and a dwelling step in which the probe is rotated only for a predetermined period at at least one of the probe starting point position and the probe end point position.

According to the above-described invention, since the dwelling step is executed at the probe starting point position or at the probe end point position, plastic flow advances around the probe starting point position or the probe end point position, thereby accelerating friction stir welding. As a result, in the disclosed embodiment(s), an oxidized film on a boundary face between each of the workpieces is markedly decreased around the probe starting point position and the probe end point position, thus making it possible to further enhance welding reliability around these positions.

Here, the predetermined period may be greater than or equal to a period during which the probe can move a distance corresponding to an outer diameter of the leading end face of a tool, on which the probe is installed, at a moving velocity when the probe is moved from the probe starting point position to the probe end point position. When the predetermined period is set as described above, plastic flow can be effected around the probe starting point position or the probe end point position at a rate greater than or equal to the plastic flow at an intermediate part between the probe starting point position and the probe end point position.

Further, the above-described production method may include an end point position avoiding step in which, after execution of the main joining step, the probe is moved, while being rotated, to the probe withdrawing position which is a position away from the probe end point position and a withdrawing step in which the probe is withdrawn from the workpiece at the probe withdrawing position. When the end point position avoiding step is carried out, a probe withdrawing hole formed at the probe withdrawing position moves away from the joint end point. It is, thereby, possible to improve the welding reliability in the vicinity of the joint end point.

The production method may also include a withdrawing position dwelling step in which the probe is rotated only for a predetermined period at the probe withdrawing position. Execution of the withdrawing position dwelling step accelerates plastic flow around the probe withdrawing position, by which the probe withdrawing hole formed at the probe withdrawing position can be made into a smooth shape to reduce the concentration of stress on the probe withdrawing hole.

Here, in the end point position avoiding step, the probe returns at a predetermined distance inside the portion to be joined from the probe end point position to the probe starting point position side. Also, a position at which the probe has returned at the predetermined distance may be given as the probe withdrawing position. In this case, after the probe at the probe end point position is slightly pressed into the workpiece side, the probe may be moved to the probe withdrawing position while maintaining the pressed amount of the probe.

Further, in order to solve the above problem, the friction stir welding apparatus of the disclosed embodiment(s) is a friction stir welding apparatus in which a rotating probe is inserted into a portion to be joined in two workpieces which are contacting each other and a friction stir welding operation is performed to the portion to be joined. The friction stir welding apparatus is provided with a mechanical unit to which a tool having the probe at the leading end can be attached and which causes the thus attached tool to rotate and move, and a control unit which controls motions of the mechanical unit.

The control unit is provided with an input/output device which receives parameters containing a probe starting point position which is a position of the probe for forming a joint starting point in one of the workpieces, a probe end point position which is a position of the probe for forming a joint end point in the workpiece and period of dwelling treatment during which the tool is rotated at at least one of the probe starting point position and the probe end point position, and a control executing device in which according to the control parameters received by the input/output device, the mechanical unit is used to position the probe at the probe starting point position, while the probe is rotated, and the probe is moved to the probe end point position, while the probe is rotated, thereby the dwelling treatment is executed only for the above-described period at at least one of the probe starting point position and the probe end point position.

In the disclosed embodiment(s), since the dwelling treatment is executed at the probe starting point position or at the probe end point position, plastic flow is advanced around the probe starting point position or the probe end point position, thereby accelerating friction stir welding. As a result, in the disclosed embodiment(s), an oxidized film on a boundary face between each of the workpieces is markedly decreased around the probe starting point position and the probe end point position. It is, thereby, possible to enhance the welding reliability around these positions.

Here, the input/output device receives, as the parameters, a moving velocity when the probe is moved from the probe starting point position to the probe end point position and an outer diameter of the leading end face of a tool on which the probe is installed. Also, when the input period of the dwelling treatment is less than the period during which the probe is able to move the diameter of the leading end face of the tool at the moving velocity, the input/output device may reject receiving the period. Alternatively, the input/output device may send a warning that the period is not appropriate. As described above, the warning is sent, and the like, by which the period of the dwelling treatment can be set appropriately.

Further, the input/output device of the control unit may receive a probe withdrawing position at which the probe is withdrawn from the workpieces and period of a withdrawing position dwelling treatment during which the tool is rotated at the probe withdrawing position. Also, the control executing device of the control unit may allow the mechanical unit to execute the withdrawing position dwelling treatment only for the above-described period at the probe withdrawing position. The withdrawing position dwelling treatment is carried out, by which plastic flow is accelerated around the probe withdrawing position and a probe withdrawing hole formed at the probe withdrawing position is made into a smooth shape. It is, thereby, possible to reduce the concentration of stress on the probe withdrawing hole.

ADVANTAGE OF INVENTION

In the disclosed embodiment(s), plastic flow is advanced around the probe starting point position and the probe end point position. Therefore, an oxidized film on a boundary face between each of the workpieces is markedly decreased around these positions. It is, thereby, possible to enhance the welding reliability around these positions.

DETAILED DESCRIPTION

Hereinafter, a description will be given of one embodiment of the disclosed embodiment(s) with reference to the drawings.

Figure 12:
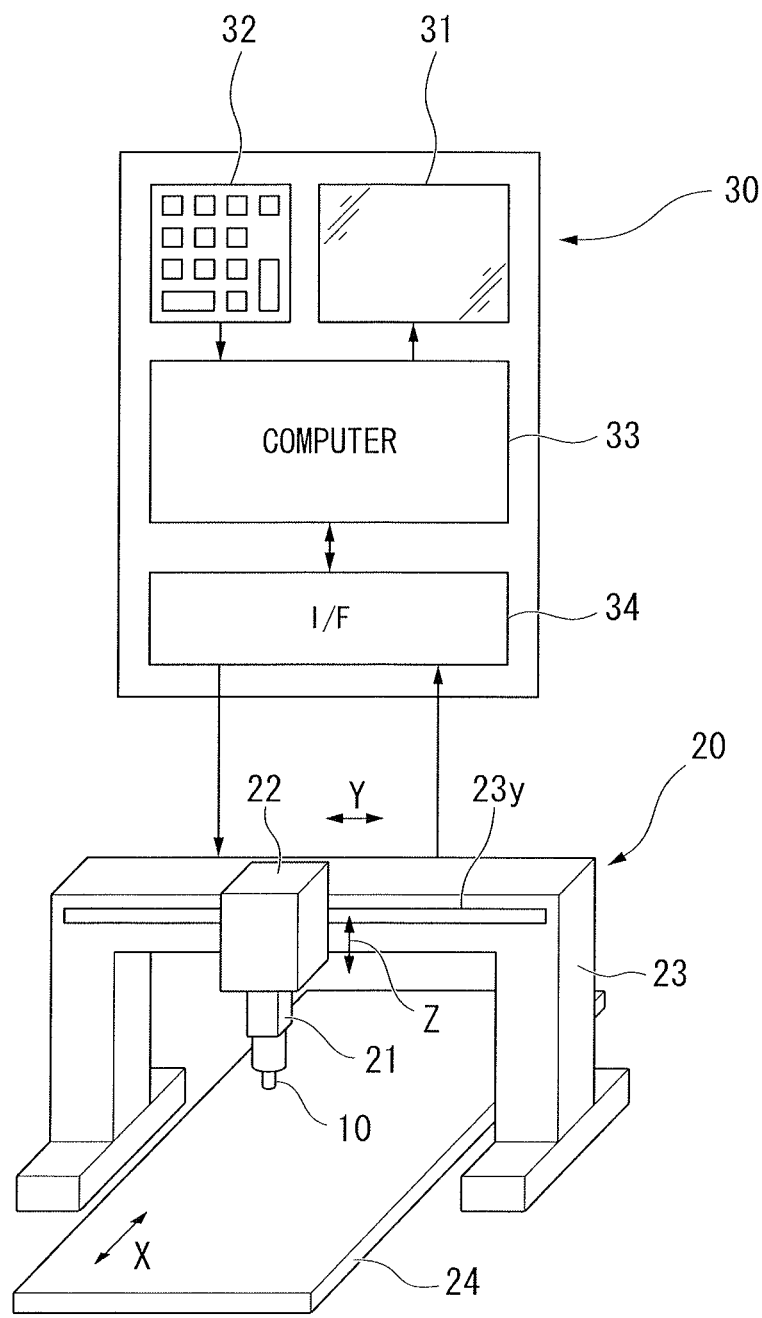
FIG. 12 is an explanatory view which shows a constitution of a friction stir welding apparatus in one embodiment of the present invention.

As shown in FIG. 12, the friction stir welding apparatus of the present embodiment is provided with a mechanical unit 20 to which a tool 10 having a probe at the leading end is attached, thereby causing the tool 10 to rotate and move, and a control unit 30 which controls the mechanical unit 20.

The mechanical unit 20 is provided with a main shaft 21 to which the tool 10 is attached, a main shaft holding head 22 which holds the main shaft 21, a gate shape frame 23 which has a Y-direction guide 23y which extends in a horizontal direction (Y direction) and on which the main shaft holding head 22 is attached, and a surface plate 24 which mounts workpieces on an upper face thereof and moves the workpieces in the X direction which is perpendicular to the Y direction which is the horizontal direction. The mechanical unit 20 is additionally provided with a hydraulic circuit, a power supply circuit, various sensors, and the like, for driving individual mechanisms of the mechanical unit 20, although they are not shown.

The main shaft holding head 22 is provided with a mechanism (not shown) which holds the main shaft 21 and rotates the main shaft 21, a Z-direction moving mechanism (not shown) which moves the main shaft 21 in a perpendicular direction (Z direction) and a Y-direction moving mechanism (not shown) which moves the main shaft 21 in the Y direction along the Y-direction guide 23$y$ installed on the gate shape frame 23.

The control unit 30 is provided with a display 31, an input key 32, a computer 33, and an interface 34 which sends a control signal made by the computer 33 to the hydraulic circuit and the power supply circuit of the mechanical unit 20 while receiving signals from various sensors of the mechanical unit 20 and sending them to the computer 33. In the present embodiment, the input/output device is constituted with the display 31, the input key 32 and the computer 33, while the control executing device is constituted with the computer 33 and the interface 34.

Figure 8:
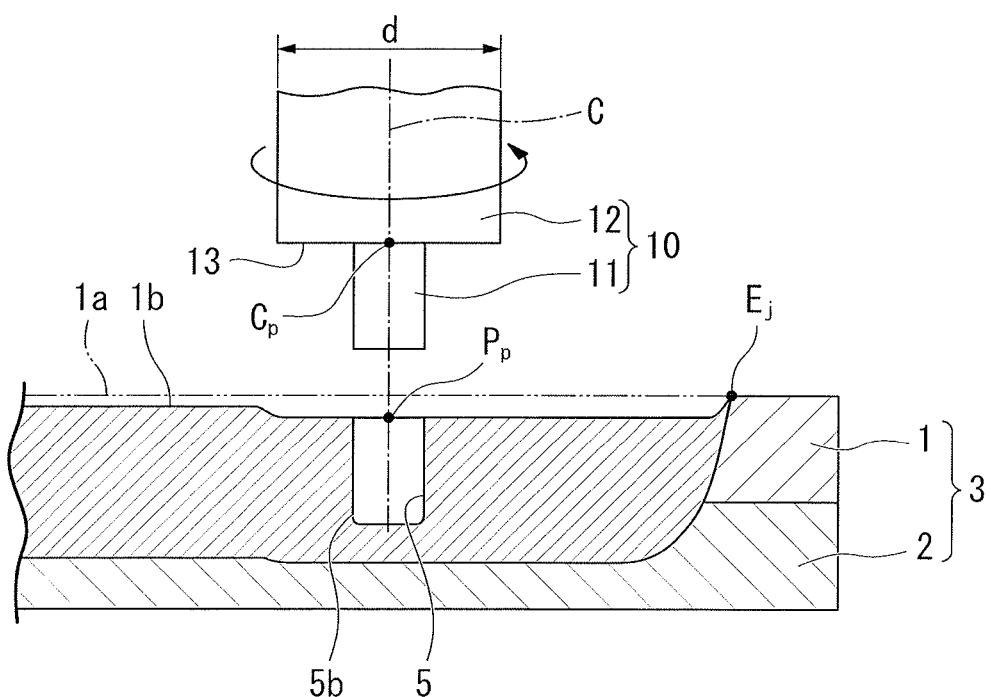
FIG. 8 is an explanatory view which shows a state of the workpieces after a withdrawing step in one embodiment of the present invention.

As shown in FIG. 8, the tool 10 is provided with a shoulder part 12 having a circular shoulder face 13 and a probe 11 which projects from the shoulder face 13 of the shoulder part 12. That is, the shoulder face 13 forms a leading end face of the tool on which the probe 11 is installed. In the present embodiment, the shoulder part 12 rotates integrally with the probe 11, but they do not necessarily rotate in an integral manner.

Next, a description will be given of procedures for producing a joined member by joining two workpieces by friction stir welding, together with motions of the friction stir welding apparatus so far described. Hereinafter, a description will be given of an example where these two workpieces are overlapped and joined.

Figure 10:
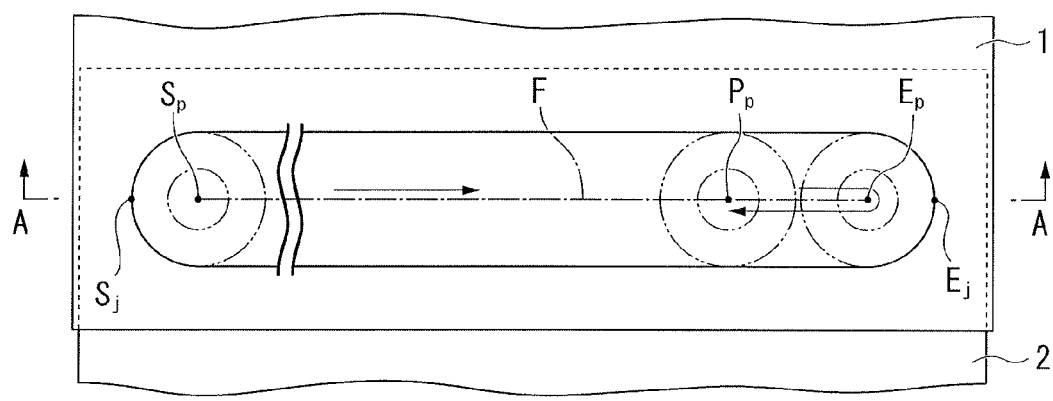
FIG. 10 is an explanatory view which shows a movement locus of the tool during a joining process in one embodiment of the present invention.

At first, as shown in FIG. 10, an operator overlaps two workpieces 1 and 2 on the surface plate 24 of the friction stir welding apparatus shown in FIG. 12, fixing them by using a jig, and the like.

Then, the operator initializes the friction stir welding apparatus. In this initialization, the tool 10 is set for an original position and various parameters are input.

Figure 13:
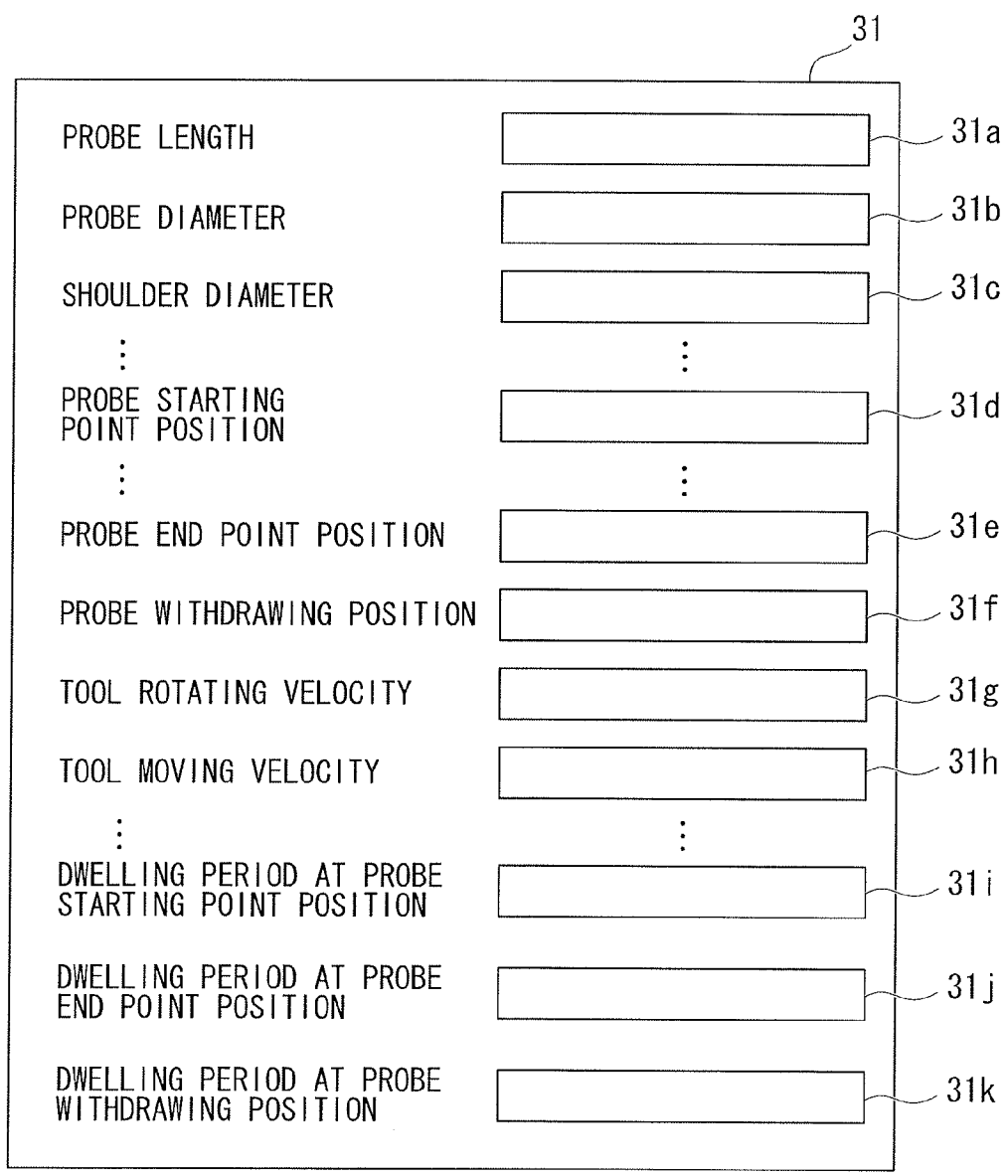
FIG. 13 is an explanatory view which shows a parameter input screen in one embodiment of the present invention.

When the various parameters are input, the computer 33 displays a parameter input screen on the display 31. As shown in FIG. 13, at least the following are indicated on the parameter input screen, that is, an input field 31$a$ for probe length, an input field 31$b$ for probe diameter, an input field 31$c$ for shoulder diameter which is an outer diameter of the shoulder face, an input field 31$d$ for a probe starting point position which is the position of the probe for forming a joint starting point in one of the workpieces, an input field 31$e$ for a probe end point position which is the position of the probe for forming the joint end point in the workpiece, an input field 31$f$ for a probe withdrawing position which is the position at which the probe is withdrawn, an input field 31$g$ for tool rotating velocity, an input field 31$h$ for tool moving velocity, an input field 31$i$ for period of dwelling treatment at the probe starting point position, an input field 31$j$ for period of dwelling treatment at the probe end point position, and an input field 31$k$ for period of dwelling treatment at the probe withdrawing position.

An operator operates the input key 32 (FIG. 12) to input a numerical value to each of the input fields of the parameters described thus far. It is not always necessary to input dwelling period to the input field 31$i$ for period of dwelling at the probe starting point position, the input field 31$j$ for period of dwelling at the probe end point position, and the input field 31$k$ for period of dwelling at the probe withdrawing position. However, hereinafter, the dwelling period is to be input for all of the input fields 31$i$, 31$j$ and 31$k$. Further, here, a position which is input as a probe position such as the probe starting point position, the probe end point position or the probe withdrawing position is, as shown in FIG. 8, positioned at a crossing point Cp between the center line C of the probe 11 and the shoulder face 13. In addition, a position which is input as a probe position may be positioned on the center line C of the probe 11 and also at the leading end of the probe 11.

Here, a brief description of the dwelling treatment will be given so far described. The dwelling treatment is executed at any one of the probe starting point position, the probe end point position and the probe withdrawing position. The dwelling treatment is a treatment in which at any one of the above-described positions, the probe 11 is rotated but not moved and the friction stir operation is performed to the workpiece in an accelerated manner around the position concerned. Dwelling period is the period during which the dwelling treatment is carried out.

After completion of the above-described initialization, the control unit 30 (FIG. 12) of the friction stir welding apparatus actuates the mechanical unit 20, thereby starting to weld two workpieces by friction stir welding.

Figure 1:
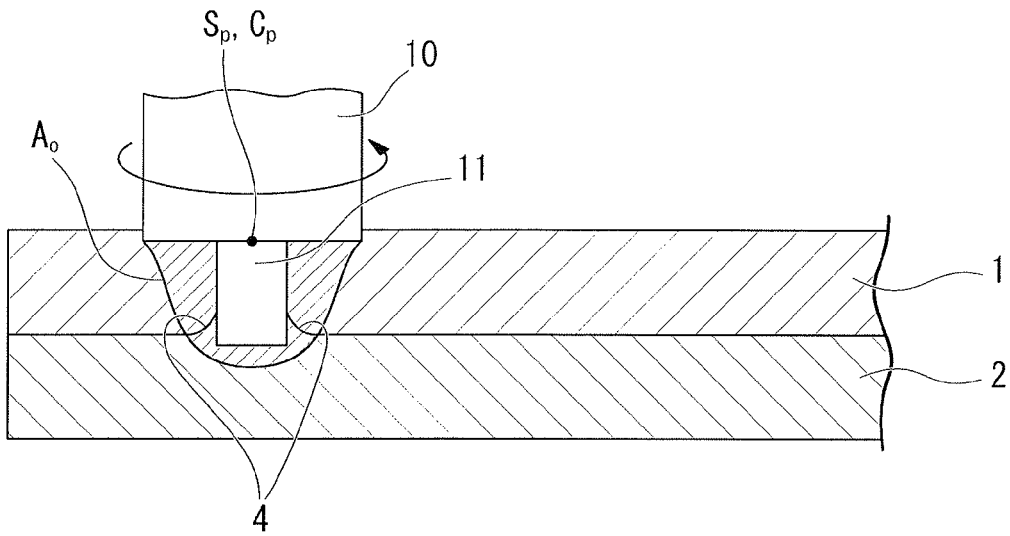
FIG. 1 is an explanatory view which shows a state of workpieces immediately after an insertion step in one embodiment of the present invention.

As shown in FIG. 1, the friction stir welding apparatus first moves the probe 11 to a parameter starting point position Sp input by parameter input treatment, while rotating the probe 11. That is, the friction stir welding apparatus executes an insertion step for inserting the probe 11 into the workpieces. FIG. 1 and FIG. 2 to FIG. 8 to be referenced by the following description all show a state of cross sections of the workpieces taken along the line A to A in FIG. 10.

In the insertion step, after the leading end of the probe 11 is in contact with the surface of the workpiece 1, the probe 11 is gradually inserted into the workpiece 1. When the rotating probe 11 and the shoulder face 13 are in contact with the workpiece 1, frictional heat is developed between them. Also, due to the frictional heat, the workpieces 1 and 2 around the probe 11 undergo plastic flow, thereby forming a plastic flow region (or dynamic recrystallization region) $A_0$.

The inventor has studied in detail the cross sections of the workpieces 1,2 to which friction stir welding is given and has found after careful examination that when the probe 11 arrives at the probe starting point position Sp, a plastic flow region $A_0$ is formed around the probe 11, but plastic flow at the plastic flow region $A_0$ is not sufficient, thereby an oxidized film 4 on a boundary face between the two workpieces 1 and 2 remains inside the plastic flow region $A_0$.

Therefore, as with the technique described in the Background Art, where after arrival of the probe 11 at the probe starting point position Sp, the probe 11 is immediately moved to a probe end point position Ep, the oxidized film 4 on the boundary face remains inside the plastic flow region $A_0$ which is opposite to a movement direction of the probe 11 based on the probe starting point position Sp. If the oxidized film 4 on the boundary face remains inside the plastic flow region $A_0$, the joining strength of this part will be reduced.

Therefore, in the present embodiment, such a dwelling step is to be executed so that after the probe 11 has arrived at the probe starting point position Sp, the probe 11 is not immediately moved to the probe end point position Ep but at the probe starting point position Sp, the probe 11 is rotated for a predetermined period and not moved.

Figure 2:
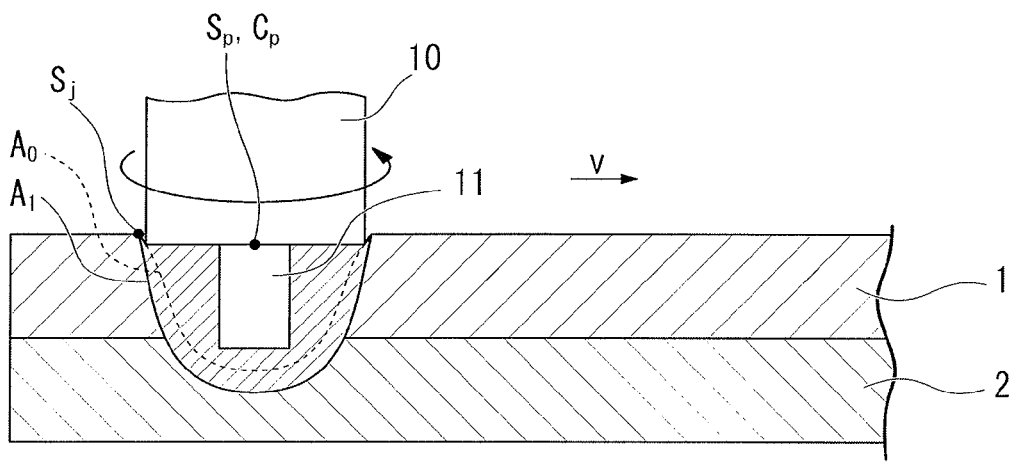
FIG. 2 is an explanatory view which shows a state of the workpieces at a probe starting point position immediately after a dwelling step in one embodiment of the present invention.

On execution of the dwelling step, as shown in FIG. 2, a plastic flow region is slightly spread, and plastic flow advances inside the thus spread plastic flow region $A_1$, thereby accelerating friction stir welding. Also, the oxidized film 4 on the boundary face inside the plastic flow region $A_0$ as shown in FIG. 1 practically disappears.

Period during which the dwelling step is executed, that is, dwelling period, is preferably greater than or equal to the period during which the tool moves on a shoulder diameter d (FIG. 8) which is an outer diameter of the shoulder face 13 input by the parameter input treatment at a tool moving velocity v which is also input by the parameter input treatment. More specifically, the dwelling period is preferably, for example, four seconds or more, although this depends on the tool moving velocity, and the like.

Fundamentally, at an intermediate part between the probe starting point position Sp and the probe end point position Ep inside the portion to be joined, friction stir period is given as (shoulder diameter)/(probe moving velocity). Therefore, in the present embodiment, the above-described dwelling period is set in order to secure the friction stir period which is greater than or equal to that at the above-described intermediate part even at the probe starting point position Sp and the probe end point position Ep.

In the present embodiment, where the dwelling period is input to the input field 31i for dwelling period at the probe starting point position Sp and the input field 31j for dwelling period at the probe end point position Ep by the parameter input treatment, and if the computer 33 (FIG. 12) determines that the dwelling period is less than the period during which the tool moves on the previously input shoulder diameter d at the tool moving velocity v also input previously, the computer 33 will not receive the input dwelling period or will send a warning to the effect that the dwelling period is not appropriate by flashing inside the input fields 31i and 31j (FIG. 13) indicated on the display 31.

Figure 3:
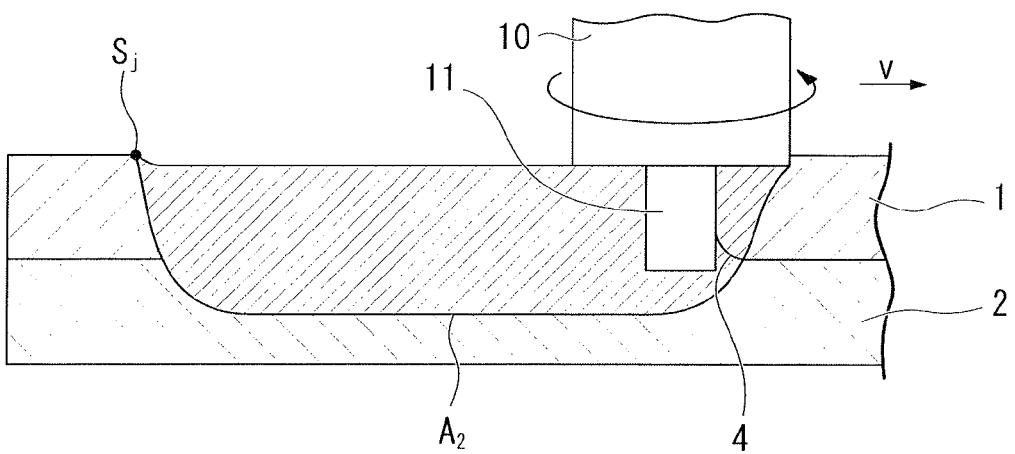
FIG. 3 is an explanatory view which shows a state of the workpieces during a main joining step in one embodiment of the present invention.

Upon completion of the dwelling period, as shown in FIG. 3, the tool 10 starts to move to the probe end point position Ep at the tool moving velocity v. Thereby, the main joining step is started. A point which is on a boundary between the plastic flow regions $A_1$ and $A_2$ at point in time subsequent to completion of the dwelling period and which is opposite to a direction at which the tool moves is given as a joint starting point Sj.

Figure 4:
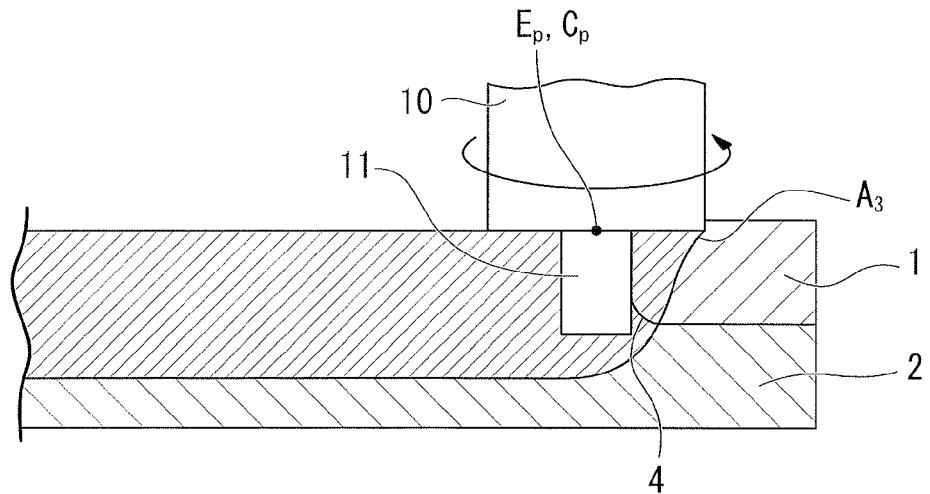
FIG. 4 is an explanatory view which shows a state of the workpieces immediately after the main joining step in one embodiment of the present invention.

As shown in FIG. 4, when the probe 11 arrives at the probe end point position Ep, the main joining step is completed. Here, the dwelling step is also executed. Moreover, the oxidized film 4 on a boundary face between the two workpieces 1 and 2 remains inside the plastic flow region $A_3$ when the probe 11 has arrived at the probe end point position Ep, which is on the side in a direction at which the probe has so far moved based on the probe 11.

Therefore, in the present embodiment, even at the probe end point position Ep, the dwelling step is executed, as with the probe starting point position Sp.

Figure 5:
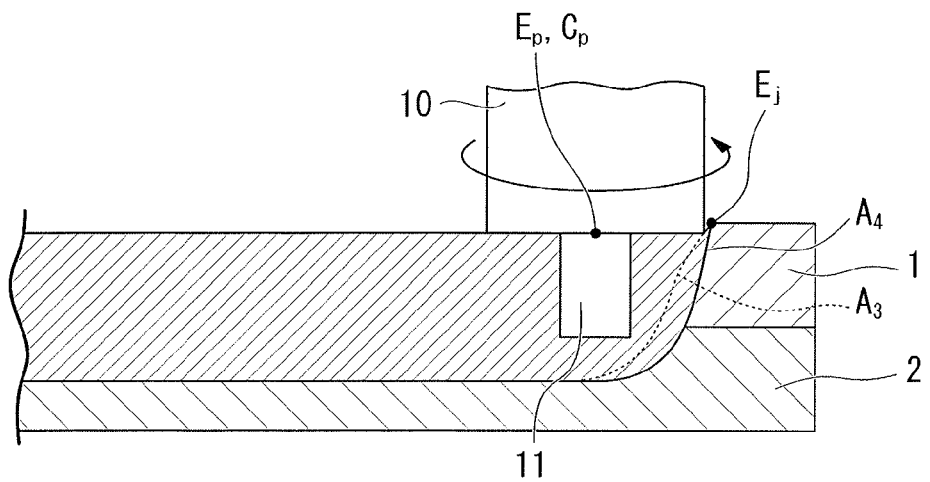
FIG. 5 is an explanatory view which shows a state of the workpieces at a probe end point position immediately after the dwelling step in one embodiment of the present invention.

When the dwelling step is executed, as shown in FIG. 5, the plastic flow region is slightly spread, and plastic flow inside the thus spread plastic flow region $A_4$ is advanced and friction stir welding is accordingly accelerated. Then, the oxidized film 4 on a boundary face inside the plastic flow region $A_3$ in FIG. 4 practically disappears. Further, a point which is on a boundary of the thus spread plastic flow region $A_4$ and on the side in a direction at which the tool has so far moved is given as a joint end point Ej.

Figure 6:
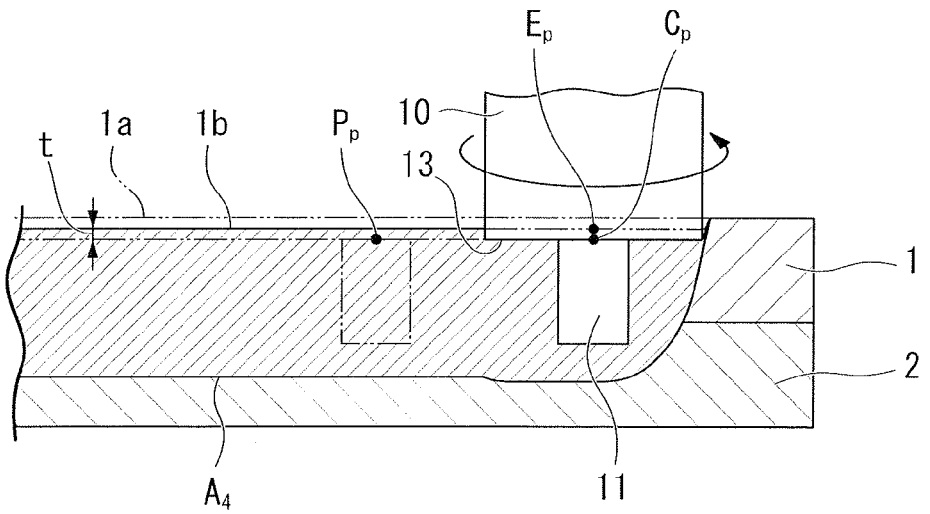
FIG. 6 is an explanatory view which shows a state of the workpieces into which a tool is pressed during an end point position avoiding step in one embodiment of the present invention.

Upon completion of the dwelling step, as shown in FIG. 6, the tool 10 slightly moves to the leading end side of the probe 11. That is, in the tool 10, the probe 11 is slightly pressed into the workpiece 1. Then, the tool 10 starts to move to a probe withdrawing position Pp at the tool moving velocity. In the present embodiment, as shown in FIG. 10, the probe withdrawing position Pp is present on a movement locus F of the probe 11 from the probe starting point position Sp to the probe end point position Ep.

Where friction stir welding is carried out, as shown in FIG. 6, the level of the surface 1b of the workpiece 1 undergoes a slight change in a direction at which the probe 11 extends from the level of the surface 1a before the friction stir welding, in other words, in the thickness direction of the workpiece 1. That is, where the friction stir welding is carried out, the surface 1a of the workpiece 1 sinks down slightly.

Therefore, if the tool 10 is not moved slightly in a direction at which the probe 11 extends at the probe end point position Ep on movement of the probe 11 from the probe end point position Ep to the probe withdrawing position Pp, the shoulder face 13 of the tool 10 will not be sufficiently in contact with a new surface 1b of the workpiece 1. Thus, no frictional heat is generated between the shoulder face 13 and the new surface 1b of the workpiece 1. Therefore, in the present embodiment, upon completion of dwelling period at the probe end point position Ep, the tool 10 is moved slightly in a direction at which the probe 11 extends, by which the shoulder face 13 of the tool 10 can be sufficiently in contact with the new surface 1b of the workpiece 1.

The position of the probe when the tool moves in a direction at which the probe 11 extends is the same as the probe withdrawing position Pp in a direction at which the probe 11 extends. Therefore, the computer 33 (FIG. 12) of the friction stir welding apparatus determines a distance t between the probe end point position Ep and the probe withdrawing position Pp in a direction at which the probe 11 extends and gives the distance t as an amount of movement in a direction at which the probe 11 extends.

Figure 7:
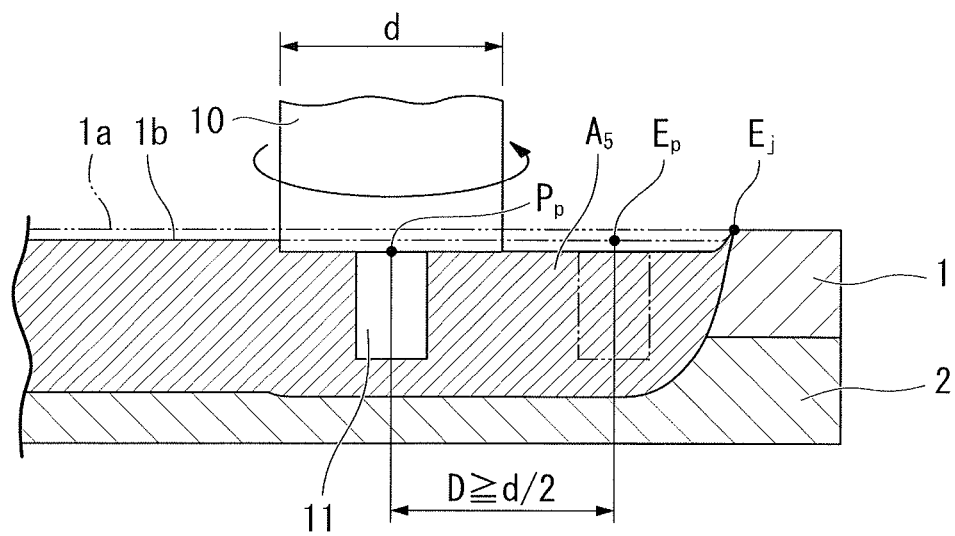
FIG. 7 is an explanatory view which shows a state of the workpieces immediately after the end point position avoiding step in one embodiment of the disclosed embodiment(s).

As shown in FIG. 7, the tool 10 is slightly pressed into the workpiece 1 at the probe end point position Ep and, thereafter, starts to move to the probe withdrawing position Pp at the tool moving velocity v, as described above. In this case, a movement distance of the tool 10, that is, a distance D between the probe end point position Ep and the probe withdrawing position Pp in a direction at which the tool moves, is preferably greater than or equal to half of the shoulder diameter d, that is, the shoulder radius, d/2. Here, the distance D is given as the shoulder diameter d.

In the present embodiment, the end point position avoiding step is a step that after completion of the dwelling step at the probe end point position Ep, the tool 10 is slightly pressed into the workpiece 1 at the probe end point position Ep and the tool 10 is moved to the probe withdrawing position Pp. As shown in FIG. 7, a plastic flow region $A_5$ which is generated upon completion of the end point position avoiding step is slightly spread in the thickness direction of the workpieces 1 and 2 more than the plastic flow region $A_4$ generated at the starting time point of the end point position avoiding step. This is due to the fact that the tool 10 is slightly pressed into the workpiece 1 at the starting time point of the end point position avoiding step.

Upon arrival of the probe 11 at the probe withdrawing position Pp, the dwelling step is also executed here. The region around the probe 11 at the probe withdrawing position Pp is a region where the probe 11 has already passed once to conduct friction stir welding. Therefore, no oxidized film remains on the boundary face between the workpieces 1 and 2, as with at the probe starting point position Sp and the probe end point position Ep.

Figure 9:
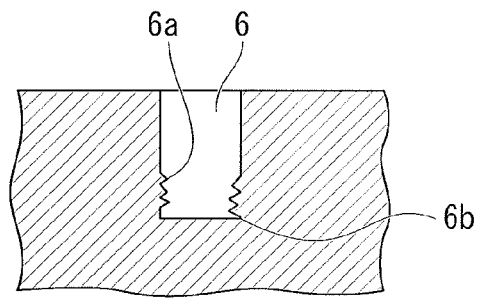
FIG. 9 is an explanatory view which shows a probe withdrawing hole.

However, when the probe 11 is raised immediately upon arrival of the probe 11 at the probe withdrawing position Pp, as shown in FIG. 9, in the probe withdrawing hole 6, a residue 6a of the workpiece, which has entered into a groove formed on an outer circumferential face of the probe, remains on an inner circumferential face of the probe withdrawing hole 6. Further, a corner between the leading end face of the probe and the circumferential face of the probe remains, with the configuration thereof maintained, thus resulting in a rough inner circumferential face of the probe withdrawing hole 6. Also, a corner 6b between the inner circumferential face of the probe withdrawing hole 6 and the bottom is made acute. This is due to the fact that plastic flow performance of the workpieces is not sufficient around the probe immediately after arrival of the probe at the probe withdrawing position Pp. As described above, the inner circumferential face of the probe withdrawing hole 6 is made rough and the corner 6b between the inner circumferential face and the bottom is made acute, by which stress will be concentrated on the acute corner, and the like.

Therefore, in the present embodiment, dwelling treatment is executed at the probe withdrawing position Pp as well, thereby enhancing the plastic flow performance of the workpieces around the probe 11 at the probe withdrawing position Pp. As a result, the dwelling step at the probe withdrawing position Pp is completed, and when the probe is withdrawn from the workpieces 1 and 2 (withdrawing step), as shown in FIG. 8, the inner circumferential face of the probe withdrawing hole 5 is made smooth and the corner 5b between the inner circumferential face and the bottom is made round. This is due to the fact that since the plastic flow performance of the workpieces is enhanced around the probe 11, the residue of the workpieces which has entered into the groove formed on the outer circumferential face of the probe flows down along the inner circumferential face of the probe withdrawing hole 5 at the withdrawing step of the probe 11.

Period during which the dwelling treatment is executed at the probe withdrawing position Pp, that is, dwelling period, is preferably greater than or equal to the period which is required when, for example, the tool moves half of the shoulder diameter d which has been input by the parameter input treatment, that is, the shoulder radius, d/2, at the tool moving velocity which has also been input by the parameter input treatment. More specifically, the dwelling period is preferably, for example, greater than or equal to two seconds, although this depends on the tool moving velocity, and the like.

In the present embodiment, when the dwelling period is input to the input field 31k of dwelling period at the probe withdrawing position Pp by the parameter input treatment, the computer 33 (FIG. 12) determines that the dwelling period is less than the period during which the tool moves half of the previously input shoulder diameter, d/2, at the tool moving velocity which has been also input previously. In this case, the computer 33 will not receive the input dwelling period or will flash the inside of the input field 31k indicated on the display 31, thereby sending a warning to the effect that the dwelling period is not appropriate.

Upon completion of the probe withdrawing step, the workpiece 1 and the workpiece 2 are joined completely to form a joined member 3.

As described so far, in the present embodiment, the probe 11 is not withdrawn at the probe end point position Ep but the probe 11 is withdrawn at a position away from the probe end point position Ep. Therefore, no probe withdrawing hole is present in the vicinity of the joint end point Ej. As a result, the present embodiment is able to enhance the welding reliability in the vicinity of the joint end point Ej.

Further, in the present embodiment, since the dwelling step is executed at the probe starting point position Sp and the probe end point position Ep, plastic flow is advanced around the probe starting point position Sp and the probe end point position Ep, thereby accelerating friction stir welding. As a result, the oxidized film 4 on a boundary face between the workpieces 1 and 2 markedly decreases or disappears around the probe starting point position Sp and the probe end point position Ep. It is, thus, possible to enhance the welding reliability at these positions.

Still further, in the present embodiment, the dwelling treatment is executed at the probe withdrawing position Pp as well. Therefore, plastic flow performance at the probe withdrawing position Pp is improved to smooth the inner face of the probe withdrawing hole 5 and remove an acute corner. It is, therefore, possible to reduce the concentration of stress on the probe withdrawing hole 5.

In the present embodiment, the dwelling treatment is executed both at the probe starting point position Sp and at the probe end point position Ep. The disclosed embodiment(s) shall not be limited thereto, and the dwelling treatment may be executed only at one of these positions. For example, where there are no heavy loads in the vicinity of the joint starting point Sj and there is no necessity for raising joining strength in the vicinity of the joint starting point Sj, the dwelling treatment may not be executed at the probe starting point position Sp.

In addition, in the present embodiment, the dwelling treatment is executed at the probe withdrawing position Pp as well. However, where it is not necessary to enhance the welding reliability in the vicinity of the probe withdrawing position Pp, the dwelling treatment may not be executed at the probe withdrawing position Pp.

Figure 11:
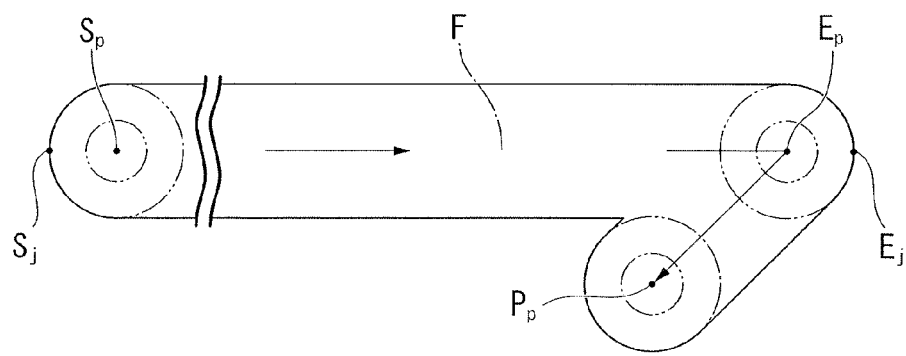
FIG. 11 is an explanatory view which shows the movement locus of the tool during the joining process in a modified example of one embodiment of the present invention.

As shown in FIG. 10, in the present embodiment, the probe withdrawing position Pp is set on the movement locus F of the probe 11 from the probe starting point position Sp to the probe end point position Ep. However, it is not necessary to set the probe withdrawing position Pp on the movement locus F of the probe 11. Also, for example, as shown in FIG. 11, the probe withdrawing position Pp may be set outside the movement locus F of the probe 11.

In the above-described embodiment, the disclosed embodiment(s) is applied to a case where two workpieces are overlapped and joined, to which the disclosed embodiment(s) shall not be, however, limited. The disclosed embodiment(s) may be applied to a case where a butt joint operation is performed to two workpieces, for example.

The disclosed embodiment(s) is a method for producing a joined member in which a rotating probe is inserted into a portion to be joined in two workpieces which are contacting each other and friction stir welding operation is continuously performed to the portion to be joined to produce the joined member. Also, the disclosed embodiment(s) relates to the method for producing a joined member which executes a main joining step in which the probe is moved, while being rotated, from a probe starting point position which is a position of the probe for forming a joint starting point in one of the workpieces to a probe end point position which is a position of the probe for forming a joint end point in the workpiece, and a dwelling step in which the probe is rotated only for a predetermined period at at least one of the probe starting point position and the probe end point position. The disclosed embodiment(s) is able to enhance the welding reliability around the probe starting point position and the probe end point position.

DESCRIPTION OF REFERENCE NUMERALS

10: Tool
11: Probe

12: Shoulder part
13: Shoulder face
20: Mechanical unit
30: Control unit
Sj: Joint starting point
Ej: Joint end point
Sp: Probe starting point position
Ep: Probe end point position
Pp: Probe withdrawing position

The invention claimed is:

1. A method of producing a joined member by a tool including a shoulder and a probe projecting from a face of the shoulder, said method comprising:
   rotating the probe and inserting the rotating probe into a portion to be joined in two workpieces, which are contacting each other, at a probe starting point position,
   keeping the probe rotating at the probe starting point position,
   moving the probe over a distance being greater than or equal to a width of the shoulder, while rotating the probe, from the probe starting point position to a probe end point position, to bond the workpieces from the probe starting point position to the probe end point position,
   keeping the probe rotating at the probe end point position, and
   determining a period during which the probe moves over the distance from the probe starting point position to the probe end point position,
   wherein
   the probe is rotated only for a predetermined period at each of the probe starting point position and the probe end point position, and
   the method further comprises determining the predetermined period to be greater than or equal to the period during which the probe moves over a distance corresponding to the width of the shoulder at a moving velocity of the probe from the probe starting point position to the probe end point position.

2. The method according to claim 1, wherein the predetermined period at the probe starting point position or at the probe end point position comprises:
   a first period in which the workpieces are heated by the rotating probe, a plastic flow region around the probe is formed, and an oxidized film on a boundary face between the workpieces remains inside the plastic flow region, and
   a second period in which the probe is rotated at the probe starting point position or the probe end point position to remove the oxidized film.

3. The method according to claim 2, further comprising:
   withdrawing the probe from the workpieces at a probe withdrawing position, wherein the probe withdrawing position is away from the probe end point position.

4. The method according to claim 3, further comprising:
   moving the probe a predetermined distance inside the portion to be joined from the probe end point position toward the probe starting point position to reach the probe withdrawing position.

5. The method according to claim 3, further comprising:
   pressing the probe at the probe end point position with a pressed amount into the workpieces, and
   moving the probe to the probe withdrawing position while maintaining the pressed amount of the probe.

6. The method according to claim 4, further comprising:
   rotating the probe at the probe withdrawing position before said withdrawing,
   wherein
   the probe is rotated only for another predetermined period at the probe withdrawing position, and
   said another predetermined period is greater than or equal to another period during which the probe moves a half of the distance corresponding to the width of the shoulder.

7. The method according to claim 5, further comprising:
   rotating the probe at the probe withdrawing position before said withdrawing,
   wherein
   the probe is rotated only for another predetermined period at the probe withdrawing position, and
   said another predetermined period is greater than or equal to another period during which the probe moves a half of the distance corresponding to the width of the shoulder.

* * * * *